No. 808,783. PATENTED JAN. 2, 1906.
E. G. SOLOMON.
TRAILING FENDER.
APPLICATION FILED NOV. 20, 1903.
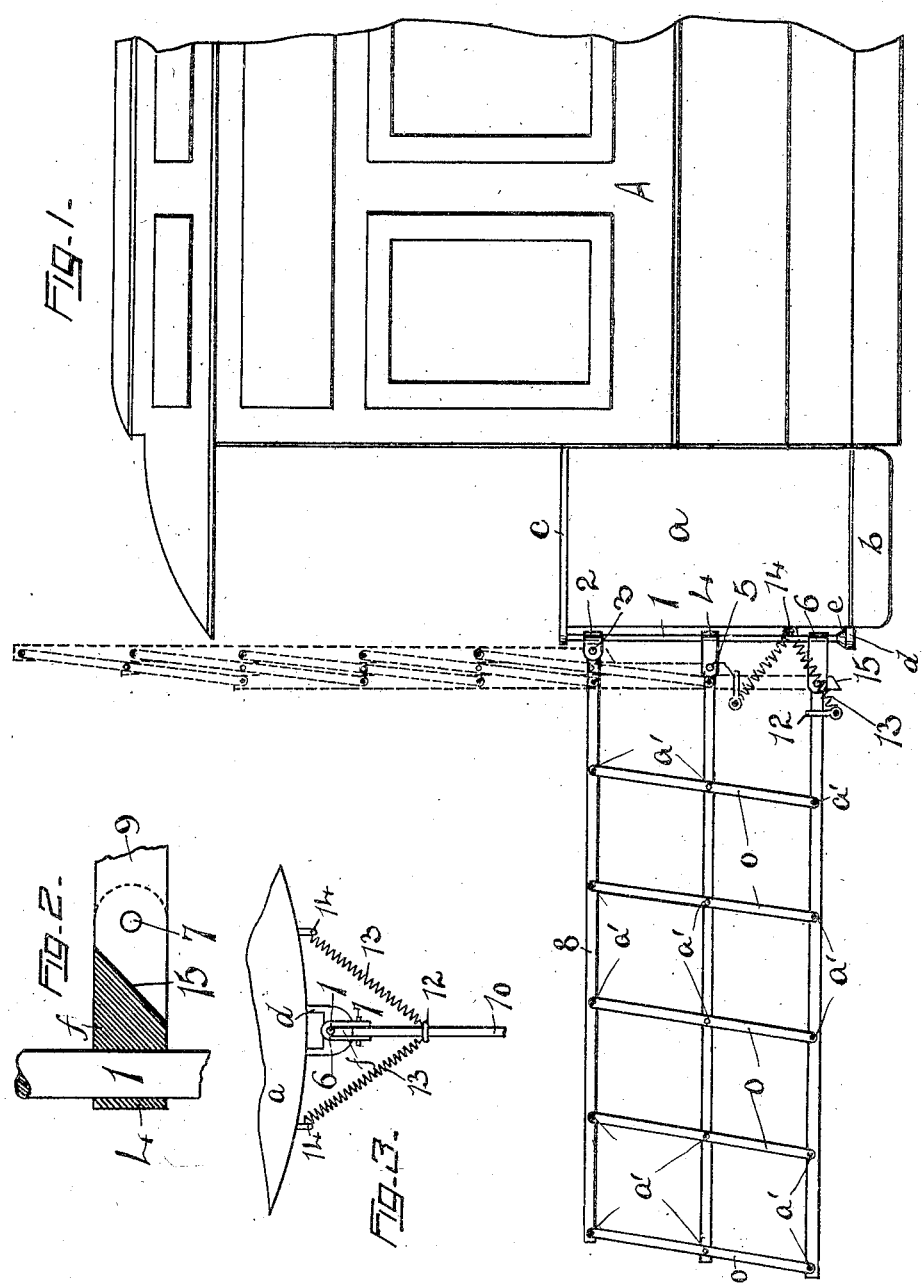
WITNESSES:
L. Worel
Etta Smith
INVENTOR
Emmet G. Solomon
BY Geo. W. Sues,
Attorney

UNITED STATES PATENT OFFICE.

EMMET G. SOLOMON, OF OMAHA, NEBRASKA, ASSIGNOR OF ONE-HALF TO HARRISON G. SHEDD, OF ASHLAND, NEBRASKA.

TRAILING FENDER.

No. 808,783.     Specification of Letters Patent.     Patented Jan. 2, 1906.

Application filed November 20, 1903. Serial No. 182,006.

*To all whom it may concern:*

Be it known that I, EMMET G. SOLOMON, residing at Omaha, in the county of Douglas and State of Nebraska, have invented certain useful Improvements in Trailing Fenders; and I do hereby declare that the following is a full, clear, and exact description of the invention, such as will enable others skilled in the art to which it appertains to make and use the same, reference being had to the accompanying drawings, which form a part of this specification.

This invention relates to a car attachment, and comprises a trailing fender or guard movably secured to the rear end of a street-car or other vehicle; and my invention comprises the combination of certain instrumentalities set forth more fully hereinafter and finally pointed out in the claims.

In the accompanying drawings, I have shown in Figure 1 a broken rear end view of a street-car provided with my trailing fender and guard. Fig. 2 shows a broken detached view of one of the fender-bars and the method of supporting the same in a horizontal position, while Fig. 3 shows a top view, with portions broken away, of my invention.

A great many accidents occur, especially in crowded cities, in that passengers in stepping off of a car pass around the rear of the same directly in front of a car going in the opposite direction, and my invention has for its aim the providing of a means whereby passengers passing around the rear end of a car, and so being in a position not to see an approaching car, will be stopped by a trailing fender or guard, which, however, is loosely swung at the rear of the car, so that even if a passenger should run directly against my spring-held fender no injury would be done the passenger or party running against the same.

My invention is further so constructed that when not in use the same may be folded up and carried out of the way, as shown.

In the accompanying drawings I have shown at A a broken portion of a street-car provided with the rear platform *a*, having the usual step *b*. This rear platform *a* is provided with the usual top railing *c*, from which I extend a loosely-held bar 1, which below is pivotally held within an ear *d*, as shown in Fig. 1, the bar 1 being provided with the collar *e* to prevent the bar 1 dropping through the ear *d*. Secured to this loosely-held bar 1 is an upper ear 2 in the form of a U-shaped strap, which is securely fixed to the bar 1, and is provided with a pin 3, pivotally supporting the upper fender-bar 8, as shown in Fig. 1.

Secured approximately midway of the end of the bar 1 is a supporting-ear 4, provided with a supporting-pin 5, this supporting-ear 4 extending outward a little farther than the supporting-ear 2, as is disclosed in Fig. 1, while near the lower end this revolubly-held bar 1 is provided with the supporting-ear 6, holding a pin 7, to which is pivotally secured a fender-bar, the pin 5 also holding the intermediate fender-bar, as disclosed. These pivotally-held fender-bars 8, 9, and 10 are connected by a plurality of transverse connecting-bars *o o*, pivotally secured by means of the pins *a'*. Now in order to hold these fender-bars 8, 9, and 10 in a horizontal position the ends of the same are cut on an angle, as is shown at 15 in Fig. 3, so that this angular portion of the bar 9, for instance, is made to rest against the angular portion *f* of the ear 4, as in Fig. 2, where I have shown a detail of the intermediate ear 4. Now, while the angular end of the fender-bar 9 will hold the bar 9 in horizontal position this bar 9 may at the same time be easily carried into a vertical position, as disclosed in dotted lines in Fig. 1, for instance, and it should be understood that each of these ears 2, 4, and 6 is provided with an angular portion, so that these bars may be held in a horizontal position. In order to hold this trailing fender in alinement with the car, but under spring tension, I provide the lower fender-bar 10 with the bracket 12, from which extend in opposite directions the coil-springs 13, secured to the ears 14. In referring to Fig. 1 it will be noticed that the bracket 12 extends downward a suitable distance below a plane passing horizontally through the pin 7, so that these springs assist in holding the fender in a downwardly-locked condition, while at the same time this fender may easily be swung against the tension of one of these springs 13 sidewise.

When the fender is not in use, the same may be carried in an upright position in raising upward the fender-bars 8, 9, and 10, which will then fold one upon the other, as is disclosed in Fig. 1 in dotted lines, the springs 13 in this instance again holding the fender-bars in a locked position under spring tension, however, so that the fender may be thrown downward when the same is brought into use.

If desired, the fender, which is made of light framework, may be covered with canvas, and so provide an admirable advertising device, which would be noticeable because of its conspicuousness. In case of cars crowding upon one another it would be an easy matter for an operator to reach down and draw up this fender, so that the same may be folded out of the way.

While this trailing spring-held fender is particularly adapted to be used in connection with electric cars, the same may be used in connection with other vehicles.

Having thus described my said invention, what I claim as new, and desire to secure by United States Letters Patent, is—

1. A car-fender adapted to be secured to the rear end of a car, comprising a pivotally-held supporting-bar, of a plurality of fender-bars pivotally secured to said supporting-bar, said fender-bars being normally adapted to be held in a horizontal position, a plurality of vertical bars pivotally securing said fender-bars to provide an approximately rectangular frame, and a spring to normally hold said frame in alinement with the car, all arranged substantially as and for the purpose set forth.

2. A car-fender adapted to be secured to the rear end of the car, comprising a pivotally-held supporting-bar, of a plurality of fender-bars pivotally secured to said supporting-bar, said fender-bars being adapted to be normally held in a horizontal position, means to connect said fender-bars, and a spring to normally hold said frame in alinement with the car.

In testimony whereof I affix my signature in presence of two witnesses.

EMMET G. SOLOMON.

Witnesses:
 DAN B. BUTLER,
 A. J. WEBB.